March 17, 1953 E. J. DILLMAN 2,631,781
HEATING AND COOLING CONTROLLER
Filed Dec. 30, 1948 2 SHEETS—SHEET 1

INVENTOR.
Earnest J. Dillman
BY
Andrew K. Foulds
his ATTORNEY

March 17, 1953 — E. J. DILLMAN — 2,631,781
HEATING AND COOLING CONTROLLER
Filed Dec. 30, 1948 — 2 SHEETS—SHEET 2

INVENTOR.
Earnest J. Dillman
BY Andrew K. Foulds
his ATTORNEY

Patented Mar. 17, 1953

2,631,781

UNITED STATES PATENT OFFICE 2,631,781

HEATING AND COOLING CONTROLLER

Earnest J. Dillman, Detroit, Mich., assignor to Detroit Controls Corporation, Detroit, Mich., a corporation of Michigan Application December 30, 1948, Serial No. 68,244

4 Claims. (Cl. 236—1)

This invention relates to new and useful improvements in fluid flow controlling valves and more particularly to valves having an automatic means to vary the operation thereof in accordance with a condition of the fluid controlled by the valve.

One of the objects of this invention is to provide a new and improved flow controlling valve.

Another object is to provide a flow controlling valve having an automatic means for varying the operation of the valve in accordance with a physical condition of the fluid passing through the valve.

Another object is to provide a thermostatically operated flow controlling valve which opens upon rise of external temperature when a cooling fluid is supplied to the valve and which closes upon rise in temperature when a heating fluid is supplied to the valve.

Another object is to provide a thermostatically operated valve having an automatic means to reverse the operation thereof when changed from controlling a heating fluid to controlling a cooling fluid.

Another object is to provide an automatically operated flow controlling valve which opens under a given set of conditions when a heating fluid is supplied to the valve and which closes under the same conditions when a cooling fluid is supplied to the valve.

Another object is to provide a novel valve especially adapted for use as a pilot valve for controlling operation of a diaphragm type flow controlling valve.

Other objects will become apparent from time to time throughout the specification and claims as hereinafter related.

This invention consists of the new and improved construction and combination of parts which will be described more fully hereinafter and the novelty of which will be particularly pointed out and distinctly claimed.

Figure 1:
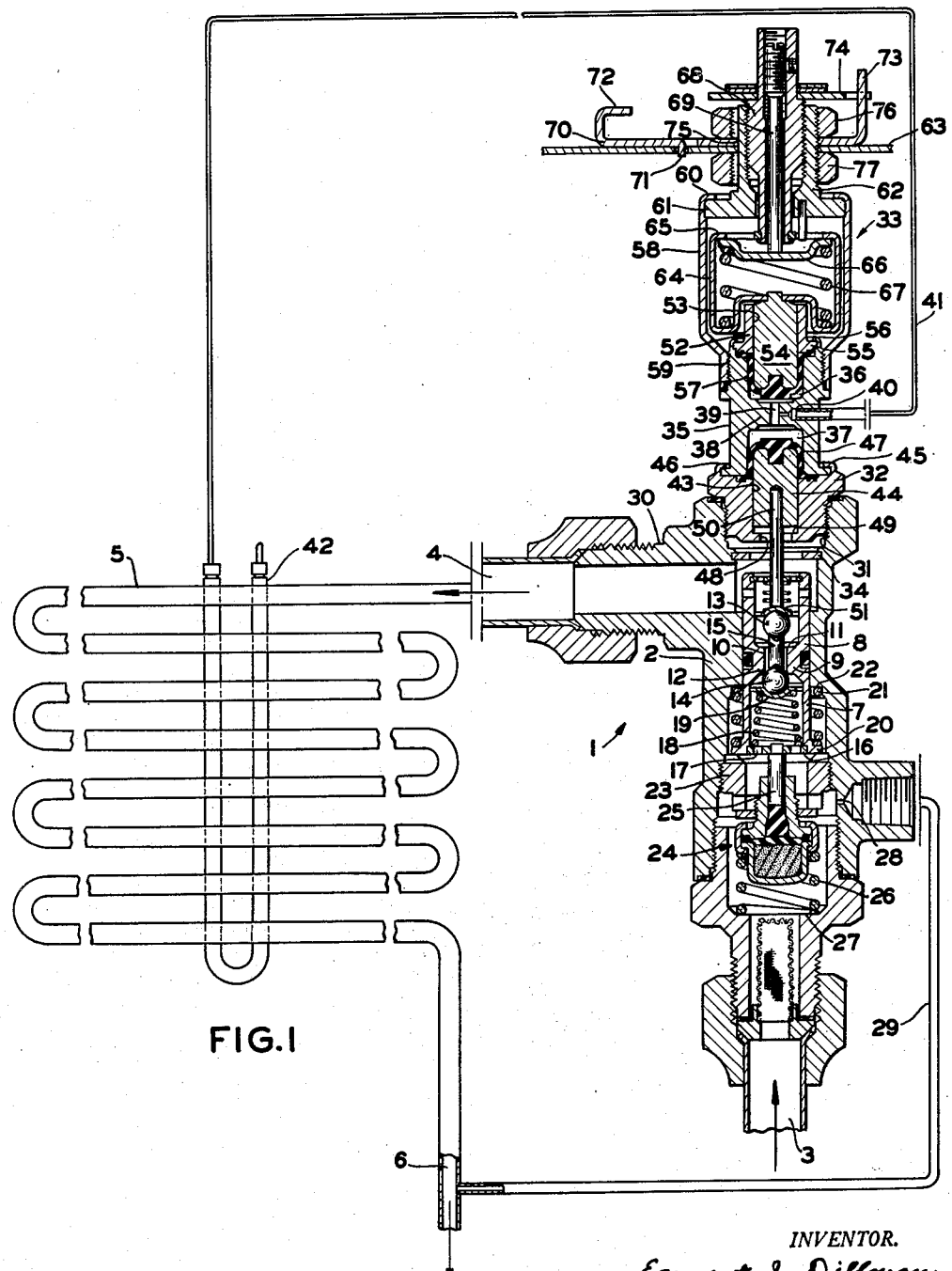
Figure 2:
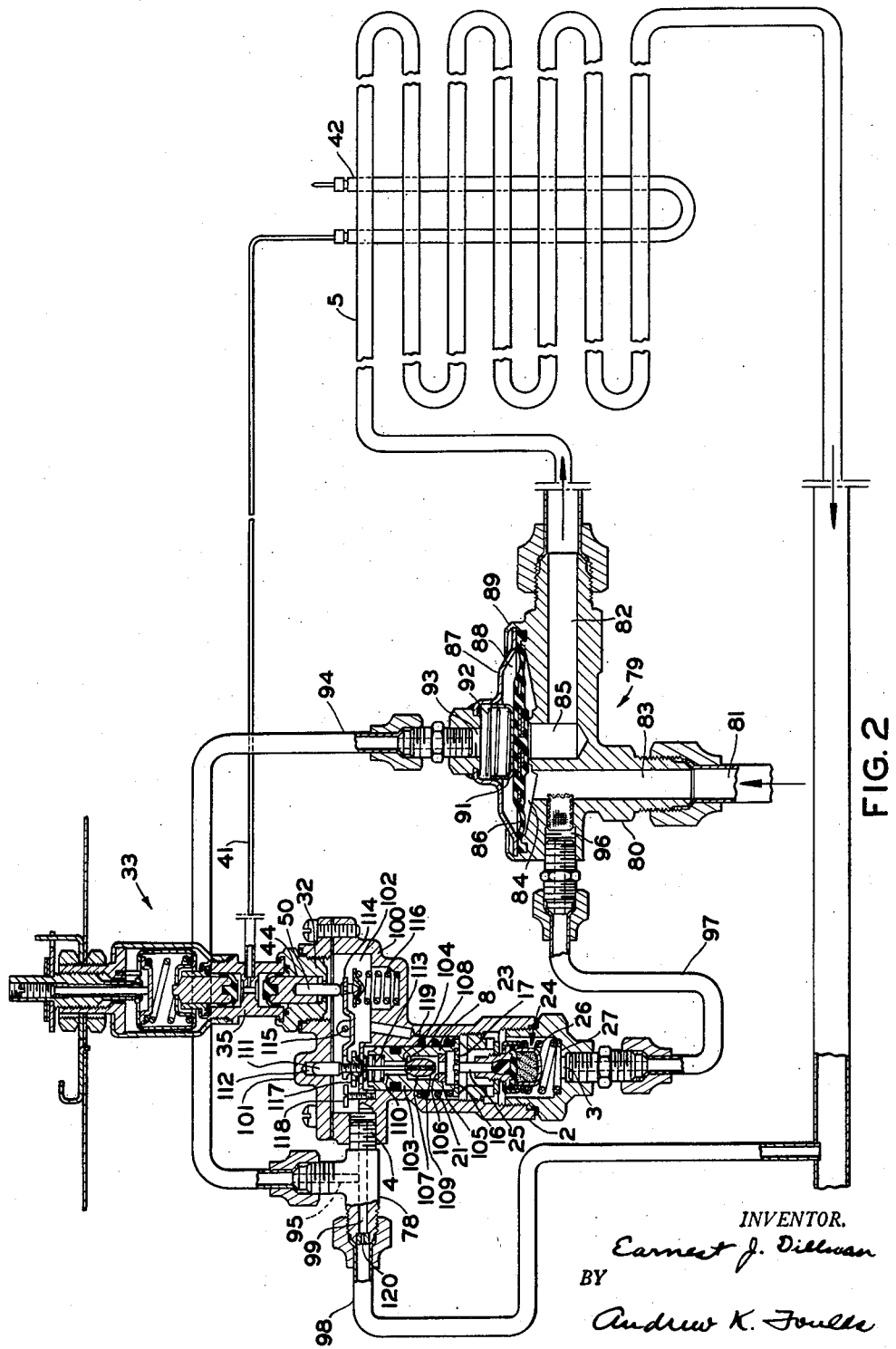

In the accompanying drawings to be taken as part of this specification there are clearly and fully illustrated two preferred embodiments of this invention, in which drawings:

Figure 1 is a view in longitudinal section of a flow controlling valve embodying one form of this invention and shown diagrammatically connected to a heat exchange system, and, Fig. 2 is a view in longitudinal section of a valve embodying another form of this invention and shown diagrammatically in a heat exchange system for use as a pilot valve controlling the operation of a diaphragm type flow controlling valve.

Referring to the drawings by characters of reference in Fig. 1 there is shown a flow controlling valve 1 comprising an elongated hollow valve casing 2 having an inlet 3 and an outlet 4 connected to the inlet of a bank of heat exchange conduits 5 having an outlet or return conduit portion 6. There is a cylindrical passageway portion 7 within the valve casing between the inlet and outlet in which there is slidably positioned a hollow cylindrical valve seat member 8. The valve seat member 8 has an internal wall 9 with an aperture 10 therethrough providing oppositely facing valve seats 11 and 12. There is a valve member which comprises two spherical valve member portions 13 and 14 which cooperate with the valve seats 11 and 12 respectively to control flow through the valve. The valve member portions 13 and 14 are positioned on opposite sides of the internal wall 9 and are spaced from each other by a thrust member 15 which extends through the aperture 10. The valve seat member 8 has an end wall member 16 on the inlet side of the valve which has a plurality of apertures 17 to permit flow therethrough. A helical spring 18 seats at one end against the wall member 16 and carries at its other end a dished thrust member 19 which engages the spherical valve member portion 14 and is operable to urge the same toward engagement with the valve seat 12. The valve seat member 8 has an annular flange 20 at its inlet end which supports one end of a helical spring 21, the other end of which seats against an annular shoulder 22 at the entrance to the cylindrical passageway portion 7. The spring 21 is operable to urge the valve seat member 8 to move toward the inlet end of the valve casing. In the inlet end of the valve casing there is a hollow nut 23 which is operable as a stop to limit movement of the valve seat member 8 by the spring 21. Also positioned in the inlet end of the valve casing there is a thermostatic power element 24 which has an operating rod or member 25 which engages the end wall 16 of the valve seat member 8 and which is operable upon movement to move the valve seat member 8 against the force of the spring 21. The particular power element shown and indicated at 24 is a thermal expansive power element of the general type shown in Patents 2,368,181 and 2,259,846 to Sergius Vernet. The power element 24 is supported by a spring 26 which seats on an annular shoulder 27 in the inlet to the valve casing. In the inlet end portion of the valve casing and adjacent the power element 24 there is provided an outlet bleed or orifice 26 which is connected by a conduit 29 to the outlet or return portion 6 of the heat exchange coil 5. The valve outlet 4 opens through a passageway in a valve casing projection 30 which is transverse to the cylindrical passageway 7. There is an end opening 31 in the valve casing which is alined with the cylindrical passageway 7 and in which is screw-threadedly secured a guide sleeve member 32 of a power element mechanism 33. In the outlet end portion of the valve casing there is provided a washer member 34 which functions as a stop for limiting movement of the valve seat member 8 by the thermostatic power element 24. The power element mechanism 33 comprises a cylindrical casing 35 having cylindrical recesses 36 and 37 with an internal wall 38 therebetween. There is an aperture or passageway 39 in the wall 38 interconnecting the recesses 36 and 37 and into which opens a transverse passageway 40 for receiving one end of a conduit 41 having a power element bulb 42 at its other end. The guide sleeve member 32 has a bore 43 in which is positioned an operating piston 44, the upper end of which extends into the cylindrical recess 37. The power element casing 35 has a flange 45 which abuts the end of the guide sleeve member 32 and which is held in position by an inturned flange 46 on the member 32. A hat-shaped flexible and elastic diaphragm 47 encloses the end of the piston 44 which projects into the recess 37 and has its edge flange secured and sealed between the flange portion 45 of the power element casing 35 and the abutting end wall of the guide sleeve member 32. There is an aperture 48 through the end wall of the guide sleeve member 32 communicating with the bore 43 to provide an annular shoulder 49 for limiting movement of the piston 44. There is a thrust member 50 which is carried by the piston 44 and which extends through the aperture 48 into the outlet end portion of the valve casing to engage the spherical valve member portion 13 through a dished thrust plate 51. There is provided a second guide sleeve member 52 which has a bore 53 therein in which there is slidably positioned a piston 54 which extends into the cylindrical recess 36. The sleeve member 52 has a flange 55 which seats on an annular shoulder at the open end of the recess 36 and which is held in position by an inturned flange 56. There is a second hat-shaped diaphragm 57 which encloses the portion of the piston 54 extending into the recess 36 and which has its edge flange portion sealed between the abutting end portions of the sleeve member 52 and the power element casing 35. There is an adjustment structure which comprises a cylindrical casing 58 which is screw-threadedly connected as at 59 to the upper end portion of the power element casing 35. The upper end portion of the casing 58 has an inturned flange 60 which secures in position the annular flange portion 61 of a threaded sleeve member 62 which extends through a supporting wall 63 to provide support and adjustment for the valve. Within the casing 58 there is positioned a cup-shaped member 64 which engages the end of the piston 54 and is operable to be moved thereby. The cup-shaped member 64 has an inturned flange 65 against which there is held a dish-shaped member 66, which member is held in position by a helical spring 67. There is a screw-threaded adjustment member 68 adjustably positioned within the bore of the sleeve member 62 and which carries a thrust rod 69 which abuts the dish-shaped member 66. There is an indicator member 70 on the upper surface of the supporting wall 63 which is pinned against rotary movement as at 71 and which has an indicator pointer portion 72 and a stop portion 73. The stop portion 73 engages an indicator dial member 74 which is carried by the adjustment member 68 and which limits the extent of rotary movement thereof. The indicator member 70 fits around the sleeve member 62 and engages a flat portion thereof as at 75 to prevent rotary movement when the adjustment member 68 is rotated. There is provided a pair of nuts 76 and 77 which are carried by the sleeve member 62 and which secure the same to the supporting wall 63.

The operation of this form of the invention is as follows: The bulb element 42, the conduit 41 and the cylindrical recesses 36 and 37 contain a thermal expansive fluid for operating the valve in response to changes in external temperature. The bulb element 42 is shown as being positioned back of the heat exchange coils 5 and in normal commercial construction would be positioned at the air intake to the heat exchange coils 5 so as to respond to the air temperature of the space being heated. The bulb element 42 is operable upon increase in temperature to transmit fluid expansion through the conduit 41 to the power element recesses 36 and 37 thereby to move the diaphragm 47 and with it the operating piston 44. The movement of the piston 44 by fluid expansion is limited by its engagement with the annular shoulder 49 which is operable to stop further movement thereof. Upon movement of the piston 44 to its limiting position further thermal expansion transmitted from the bulb element 42 will be taken up by moving the diaphragm 57 and piston 54 causing the same to move the cup-shaped member 64 and compressing the spring 67. The adjustment member 68 is operable upon movement to vary the position of the cup-shaped member 64 and thereby to vary the position of the piston 54. This variation of the position of the piston 54 is operable to vary the total volume of the power element recesses 36 and 37 so as to vary the amount of thermal expansion required to move the operating piston 44 and thus to vary the temperature of response of this power element structure. The movable valve seat member 8 is provided so that the operation of the valve may be reversed for control of heating or cooling fluid. In the position shown in Fig. 1 the valve structure is arranged for controlling flow of a cooling fluid to the heat exchanger 5. Upon temperature increase of the bulb element 42 the piston 44 is moved downward causing the thrust member 50 to move the valve member 14 away from its valve seat 12 to permit flow of cooling fluid to the heat exchanger 5. The annular shoulder 49 which limits movement of the operating piston 44 prevents the upper valve member 13 from being moved to close against its valve seat 11 when cooling fluid is being supplied. Similarly, upon temperature decrease the valve member moves to throttle flow of cooling fluid to the heat exchanger.

When a heating fluid is supplied to the valve the power element 24 will respond thereto and cause the thrust rod 25 to move the valve seat member 8 to its upper limiting position against the washer 34. When the valve seat member 8 is moved to the upper limiting position the valve member 13 is positioned for cooperation with the valve seat 11. In this position an increase of temperature by the bulb element 42 will cause the operating piston 44 acting through the thrust rod 50 to move the valve member 13 to closed position against its valve seat 11. Similarly, upon decrease of temperature of the bulb element 42 calling for heat, the upward movement of the piston 44 will cause the valve member 13 to move away from its valve seat 11 to permit the supply of heating fluid to the heat exchanger 5. Accordingly, when the system is again changed to supply cooling fluid, the power element 24 will contract permitting the spring 21 to move the valve member 3 to its lower limiting position against the nut 23 for cooling operation as previously described. Upon temperature increase of fluid supplied to the valve the spring 26 is operable to permit reactive movement of the power element 24 after the valve seat member 8 has moved to its limiting position against the washer 34. The outlet aperture or orifice 28 is provided so that there will be a continuous circulation of heating or cooling fluid over the power element 24 when the valve is closed thereby insuring an accurate and sensitive response by the power element 24.

From the foregoing it is seen that there is provided a simple valve structure whereby a thermostatic valve may be automatically changed to control heating or cooling fluid in accordance with the temperature of the fluid supplied. In its broadest sense this automatic change is effected by the use of a pair of movable flow controlling members, one of which may be movable to one position or another and when in one position is cooperable with the other member to control fluid flow for heating operation and when in another position is cooperable with the other member for controlling fluid flow for cooling operation.

In the form of the invention shown in Fig. 2 the valve of Fig. 1 is adapted for use in controlling a diaphragm type valve and when so used functions as a pilot valve. Portions of the structure of the valve shown in Fig. 2 which are common to those shown in Fig. 1 are given the same reference characters and their operation is substantially the same as in Fig. 1.

There is a valve casing 2 having an inlet 3 and an outlet 4 in which there is positioned an outlet T member 78. There is a main diaphragm type valve 79 which comprises a valve casing 80 having an inlet 81 and an outlet 82 which is connected to the inlet of a heat exchanger 5. The inlet 81 opens into an inlet passageway 83 which in turn opens into an annular cavity or pressure chamber 84. The outlet 82 opens from an outlet passageway 85 which opens into the pressure chamber 84. The outlet passageway 85 is closed by a flexible diaphragm 86 which extends across the pressure chamber 84 and has its edge secured to the upper face of the valve casing. There is a dish-shaped cover member 87 which covers the diaphragm 86 and secures the edge of the same against upper face of the valve casing 80 and which encloses a second pressure chamber 88. The edge of the cover member 87 fits over the edge of the diaphragm 86 and is secured and sealed in place by an inturned casing flange 89 which compresses the cover against the diaphragm to effect a seal therewith. There is a cup-shaped thrust member 91 positioned against the upper surface of the diaphragm 86 and which is urged towards a valve closing position by a helical spring 92. There is an inlet opening 93 through the cover member 87 in which is connected one end of a conduit or bleed line 94, the other end of which is connected to one leg 95 of the outlet T 78 of the pilot valve 2. An outlet passageway 96 opens from the inlet passageway 83 of the diaphragm valve 79 and is connected by a conduit or bleed line 97 to the inlet 3 of the pilot valve 2. A conduit 98 is connected at one end to the other leg 99 of the pilot outlet T 78 and is connected at its other end to the return line from the heat exchanger 5. The pilot valve casing 2 has an enlarged end portion 100 having a cover member 101 secured and sealed thereto and enclosing an outlet chamber 102. The movable valve seat member 8 has a first internal wall 103 corresponding to the wall 9 of the member 8 in Fig. 1 and which has an aperture providing a first valve seat 104. There is a second internal wall 105 having an aperture therethrough which provides a second valve seat 106. Between the walls 103 and 105 there is positioned a valve member 107 which has a first valve face 108 cooperable with the valve seat 104 and a second valve face 109 cooperable with the valve seat 106. The valve member 107 is carried by the valve stem 110 which has an enlarged upper portion 111 guided in a cylindrical recess 112 in the valve casing cover member 101. The valve stem 110 is urged upward by a helical spring 113. There is a lever member 114 which is pivoted at 115 in the valve casing end portion 100 and is urged in a counterclockwise direction by a helical spring 116. Upward movement of the valve seat member 8 is limited by an inturned flange 117 which also limits downward movement of the valve stem 110. Upward movement of the valve stem 110 is limited by a limit screw 118. The thermostatic power element on this valve and its operation and adjustment is substantially identical to that shown in Fig. 1 and is carried by the cover member 101. The guide sleeve 32 is screwthreadedly positioned in an aperture in the cover member 101 and the operating piston 44 and its thrust rod 50 which extends into the chamber 102 are operable to move the operating lever 114. There is provided a bypass or bleed 119 from the inlet to the outlet side of the valve to permit continuous circulation of fluid for accurate response by the power element 24. There is also provided a restricting opening or orifice 120 in the leg 99 of the outlet T 78, the purpose of which will be described hereinafter.

The operation of this form of the invention is as follows: The valve shown in Fig. 2 is utilized as a pilot valve to control flow through a larger diaphragm type valve by controlling the operating pressure supplied to the diaphragm valve. The diaphragm valve 79 shown in this form of the invention is well known in the prior art and its operation is briefly as follows: Fluid is supplied to the inlet 81 to the pressure chamber 84. Pressure from the inlet side of the valve is supplied through the bleed lines 97 and 94 which lead to the pressure chamber 88 enclosed by the cover member 87 on the other side of the diaphragm 86. When a high pressure near that of the fluid line pressure is supplied to the pressure chamber 88 this pressure plus the force of the spring 92 is operable to move the diaphragm 86 to close the outlet passageway 85 to prevent flow through the valve. When the pressure in the chamber 88 is sufficiently reduced by the operation of the pilot valve the fluid line pressure then will overcome the force of the spring 92 and move the diaphragm 86 away from the opening of the outlet passageway 85 to permit the flow of fluid to the heat exchanger 5. The pilot valve 2, as shown, is in position for controlling flow of a cooling fluid to the heat exchanger 5. When the valve 108 is closed against the valve seat 104 a continuous circulation of fluid for accurate response of the power element 24 is effected by the bypass 119. The outlet bleed or orifice 120 in the outlet T member 78 is slightly larger in flow area than the bypass 119 so that when the valve is closed fluid which is permitted to flow through the bypass 119 may all be discharged through the outlet orifice 120 without supplying a valve closing pressure through the conduit 94 to the chamber 88 of the diaphragm valve. When the valve 108 is closed as herein shown there is little or no pressure in the chamber 88 of the diaphragm valve 79 and the fluid line pressure is operable to open the valve to permit flow of cooling fluid as was previously described. When the room temperature is lowered sufficiently and the bulb element 42 is cooled, the fluid within the power element recesses will have contracted and the spring 116 will then rotate the lever 114 in a counterclockwise direction to move the valve 108 away from the valve seat 104 and permit flow of fluid through the valve. When the valve is open, the flow therethrough is in excess of the flow through the outlet orifice 120 and pressure is backed up through the bleed line 94 into the space 88 above the diaphragm 86 which together with the spring 92 is operable to close the diaphragm valve 79.

When a heating fluid is supplied to the heat exchanger 5 the flow of fluid through the bypass 119 and orifice 120 will permit sufficient circulation for temperature response of the power element 24. As the power element is heated, the valve seat member 8 is moved upward so that the valve 109 will cooperate with the valve seat 106 to control flow through the pilot valve. When in this position the pilot valve will operate to open the diaphragm valve upon cooling which operation is the reverse of that previously described. On the heating cycle when the bulb element 42 is cooled the operating piston 44 will move upward permitting the lever 114 to rotate in a counterclockwise direction and close the valve 109 against the valve seat 106 thus reducing the pressure in the pressure chamber 88 and permitting the diaphragm valve 79 to open. Similarly, upon increase in temperature of the bulb element 42 the lever 114 will be rotated in a clockwise direction thus opening the valve to permit flow therethrough and thereby causing pressure to be transmitted to the pressure chamber 88 to close the diaphragm valve 79. The adjustment of temperature response for this form of valve is substantially identical to that shown and described for the valve shown in Fig. 1. Although the pilot valve shown in this form of the invention is so connected that the diaphragm valve will open upon closing of the pilot valve it is simple to connect this pilot valve so that the reverse will take place, that is, the diaphragm valve will be opened upon opening of the pilot valve. Such connections of pilot valves and diaphragm valves are well known in the prior art and need not be elaborated upon here. It should also be noted that the pilot valve could be connected to control the application of pressure to the main valve from an external source instead of through a bleed line from the inlet of the main valve. In such a connection the pilot valve would function in substantially the same manner as just described.

Having thus described the invention, what is claimed and desired to be secured by Letters Patent of the United States is:

1. In a flow controlling valve, an elongated valve casing having a passageway extending through its entire length, one end of said passageway forming an inlet, an outlet through said casing at the other end of said passageway and transverse thereto, a cylindrical passageway portion between said inlet and said outlet, a hollow cylindrical valve seat member slidably positioned in said cylindrical passageway portion, said member having a transverse internal wall with an aperture therethrough providing oppositely facing valve seats, a valve member having two spherical valve portions positioned on opposite sides of said internal wall and having an interconnecting thrust member extending through said aperture and a valve thrust rod extending into the outlet end portion of said passageway, means in said casing providing annular shoulders limiting movement of said valve seat member, one of said valve portions being cooperable with one of said valve seats when said valve seat member is at one limit of movement and operable to close upon valve member movement in one direction, the other of said valve portions being cooperable with the other of said valve seats when said valve seat member is at the other limit of movement and operable to close upon valve member movement in the opposite direction, a thermostatic power element movably positioned in the inlet end of said passageway and operable to move said valve seat member to said one limit when a heating fluid is supplied to said casing and to said other limit when a cooling fluid is supplied, a helical spring supporting said power element in a fixed initial position and operable to permit reactive movement thereof from said initial position when the temperature of heating fluid supplied exceeds that required to move said valve seat member to said one limit, an outlet orifice through said casing wall on the inlet side of said valve and operable to permit continuous flow of fluid over said power element to obtain an accurate response thereof, a thermostatic power element operable to move said valve member in said one direction upon rise in external temperature and comprising a cylindrical casing having cylindrical recesses in the opposite ends thereof and an internal wall therebetween, a first passageway interconnecting said recesses, a second passageway opening transversely through said casing into said first passageway, a first guide sleeve member secured to one end of said casing and having a bore concentric with one of said cylindrical recesses and terminating in an annular shoulder, said first guide sleeve member extending into and being secured in the outlet end of said valve casing passageway, a first piston slidably positioned in said bore and extending into said one recess, said piston being limited in its movement in one direction by said annular shoulder, a first hat-shaped diaphragm enclosing the end of said piston in said one recess and having its edge flange secured and sealed between the abutting end portions of said casing and said sleeve member, a second guide sleeve member secured to the other end of said casing and having a bore concentric with the other of said recesses, a second piston slidably positioned in said last-named bore and extending into said other recess, a second hat-shaped diaphragm enclosing the end of said second piston in said other recess and having its edge flange secured and sealed between the abutting end portions of said casing and said second sleeve member, a conduit opening at one end into said second passageway and having at its other end a bulb element, said casing, said conduit and said bulb element enclosing a thermal expansive fluid, said bulb element being responsive to temperature external of said casing and operable to transmit fluid expansion through said conduit to said casing, spring means abutting said second piston and resisting movement thereof, adjustment means operable to vary the force of said spring means, said fluid expansion being operable to move each of said diaphragms and said pistons, the force of said spring means determining the amount of movement of said second piston relative to said first piston thereby determining the volume of fluid in said casing and the temperature of power element response, and said spring means being operable as a safety means to permit movement of said second piston after said first piston has moved to its limit of travel thereby permitting continued fluid expansion without damage beyond the temperature of power element response.

2. In a heating and cooling system having a valve for controlling flow to a heat exchanger which valve has a pressure responsive member closing off flow therethrough and responsive to fluid line pressure on one side and pressure supplied by a bleed line from the valve inlet on the other side and operable to open when the pressure on the other side of the responsive member is low and to close when the pressure on the other side of the responsive member is high; a valve for controlling flow through said bleed line comprising a valve casing having an inlet connected to said bleed line from said first-named valve and an outlet connected to said bleed line leading to the other side of said responsive member, a passageway in said valve casing interconnecting its inlet and outlet, a valve member in said passageway for controlling fluid flow therethrough and having oppositely facing valve faces, a hollow valve seat member slidably positioned in said passageway, said valve seat member having two spaced transverse internal walls with apertures therethrough providing two internally facing valve seats, means in said passageway limiting movement of said valve seat member, means limiting the extent of valve member movement, a spring urging said valve seat member to one limit of its movement, a thermostatic power element positioned in the inlet end of said passageway and operable to move said valve seat member to the other limit of movement when heating fluid enters said casing, a thermostatic power element connected on the outlet end of said casing and responsive to temperature external of said casing, said last-named power element being operable upon rise in temperature to move said valve member in one direction, one of said valve faces being cooperable with one of said valve seats when said valve seat member is at said one limit of movement and operable to close said passageway upon valve member movement in said one direction, the other of said valve faces being cooperable with the other of said valve seats when said valve seat member is at said other limit of movement and operable to close said passageway upon valve member movement in the opposite direction, a bypass in said casing extending from the inlet to the outlet side of said valve, a second outlet opening in the outlet end portion of said valve casing which is larger than said bypass and smaller than said valve apertures, said bypass and said second outlet being cooperable to permit continuous flow through said valve casing when said valve member is in closed position to effect an accurate response by said first-named thermostatic power element and without supplying pressure through said outlet bleed line, and said valve member when open being operable to permit flow through said passageway in excess of that discharged through said second outlet so that a valve closing pressure will be supplied through said outlet bleed line to the other side of said responsive member.

3. In a heating and cooling system having a valve for controlling flow to a heat exchanger which valve has a pressure responsive member closing off flow therethrough and responsive to fluid line pressure on one side and pressure supplied by a bleed line from the valve inlet on the other side and operable to open when the pressure on the other side of the responsive member is low and to close when the pressure on the other side of the responsive member is high; a valve for controlling flow through said bleed line comprising a valve casing having an inlet connected to said bleed line from said first-named valve and an outlet connected to said bleed line leading to the other side of said responsive member, a passageway in said valve casing interconnecting its inlet and outlet, a valve member in said passageway for controlling fluid flow therethrough and having oppositely facing valve faces, a hollow valve seat member slidably positioned in said passageway, said valve seat member having two spaced transverse internal walls with apertures therethrough providing two internally facing valve seats, means in said passageway limiting movement of said valve seat member, means limiting the extent of valve member movement, a spring urging said valve seat member to one limit of its movement, a thermostatic power element positioned in the inlet end of said passageway and operable to move said valve seat member to the other limit of movement when heating fluid enters said casing, said valve member having a valve stem extending into the outlet end portion of said valve casing, a lever pivoted in the outlet end portion of said valve casing and connected to said valve stem for moving the same, a power element casing connected to the outlet end portion of said valve casing and having two movable wall members defining a power element chamber, a thrust member interconnecting one of said wall members and said lever and operable to move the same, a conduit opening at one end into said chamber and having at its other end a bulb element, said chamber and said bulb element and conduit having a thermal expansive fluid enclosed therein, said bulb element being operable in response to external temperature changes to transmit through said conduit fluid expansion to said chamber for moving said one wall member, said other wall member being adjustable to determine the volume of said chamber and thereby determining the temperature of power element response, a spring cooperable with said other wall member and operable to permit movement of the same to permit continued fluid expansion after the limit of valve member movement has been reached, one of said valve faces being cooperable with one of said valve seats when said valve seat member is at said one limit of movement and operable to close said passageway upon valve member movement in said one direction, the other of said valve faces being cooperable with the other of said valve seats when said valve seat member is at said other limit of movement and operable to close said passageway upon valve member movement in the opposite direction, a bypass in said casing extending from the inlet to the outlet side of said valve, a second outlet opening in the outlet end portion of said valve casing which is larger than said bypass and smaller than said valve apertures, said bypass and said second outlet being cooperable to permit continuous flow through said valve casing when said valve member is in closed position to effect an accurate response by said first-named thermostatic power element and without supplying pressure through said outlet bleed line, and said valve member when open being operable to permit flow through said passageway in excess of that discharged through said second outlet so that a valve closing pressure will be supplied throuugh said outlet bleed line to the other side of said responsive member.

4. In a flow controlling valve, a valve casing having an inlet and an outlet, said casing having an interconnecting passageway comprising a guide portion of reduced diameter and a passageway portion of enlarged diameter forming therewith a shoulder, a movable valve seat member slidably guided in said guide portion, said valve seat member having a surrounding flange at one end extending into said enlarged passageway portion, a valve member having two valve surfaces co-operable with said valve seat member to control flow through said passageway, one of said valve surfaces cooperating with said valve seat member when moved to one position to close said passageway upon valve member movement in one direction, the other of said valve surfaces co-operating with said valve seat member when moved to another position to close said passageway upon valve member movement in the opposite direction, means limiting valve member movement in one direction, a helical spring surrounding said valve seat member in said enlarged passageway portion and compressed between said flange and said shoulder to hold said valve seat member initially in one position, a thermostatic power element responsive to the temperature of fluid on the inlet side of said valve and operable to move said valve seat member to said one position or said other position to determine whether said valve will be opened or closed for a given direction of valve member movement, a thermostatic power element for moving said valve member comprising means enclosing a thermal expansive fluid in a power element chamber, two movable wall members in said chamber, one of said wall members being connected to said valve member and operable to move the same in response to expansion of said thermostatic fluid, a bulb element having an interconnecting conduit opening into said chamber and operable to respond to temperature external of said valve casing and to transmit fluid expansion to said chamber, the other of said wall members being adjustably movable to determine the volume of said chamber and thereby to determine the temperature of response of said power element, and spring means resisting movement of said other wall member and operable to permit movement of the same to provide for additional expansion of said chamber after said one wall member has been moved to the limit of valve member travel.

EARNEST J. DILLMAN.

REFERENCES CITED

The following references are of record in the file of this patent:

UNITED STATES PATENTS

| Number | Name | Date |
| --- | --- | --- |
| 1,646,686 | Crosby | Oct. 25, 1927 |
| 1,987,032 | Spence | Jan. 8, 1935 |
| 2,053,974 | Smith | Sept. 8, 1936 |
| 2,100,037 | Sandvoss | Nov. 23, 1937 |
| 2,353,889 | Giesler | July 18, 1944 |
| 2,463,598 | Carson | Mar. 8, 1949 |
| 2,463,599 | Branson | Mar. 8, 1949 |
| 2,463,600 | Carson | Mar. 8, 1949 |
| 2,495,226 | Crago | Jan. 24, 1950 |
| 2,575,100 | Duey | Nov. 13, 1951 |